Patented Mar. 9, 1954

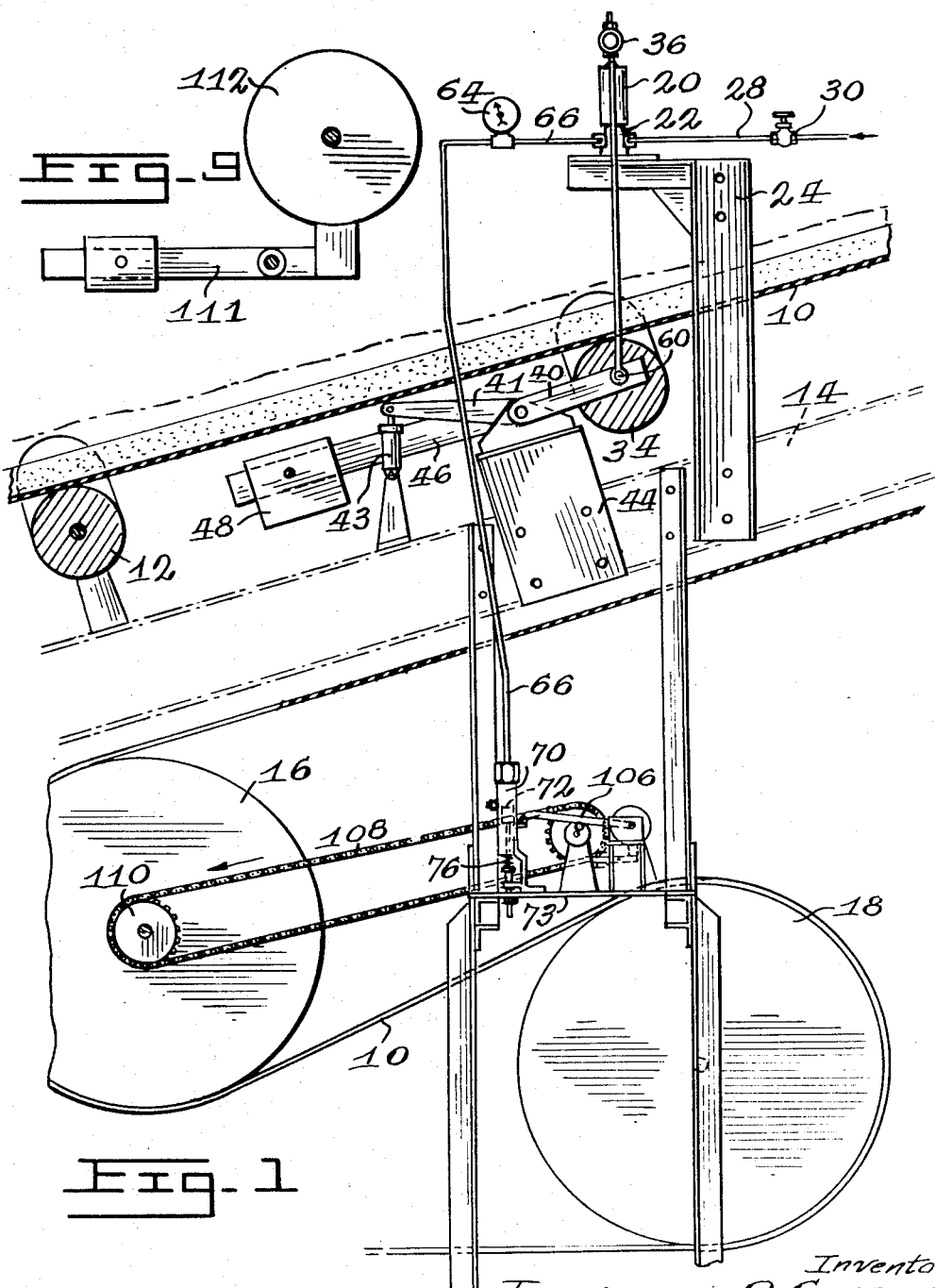

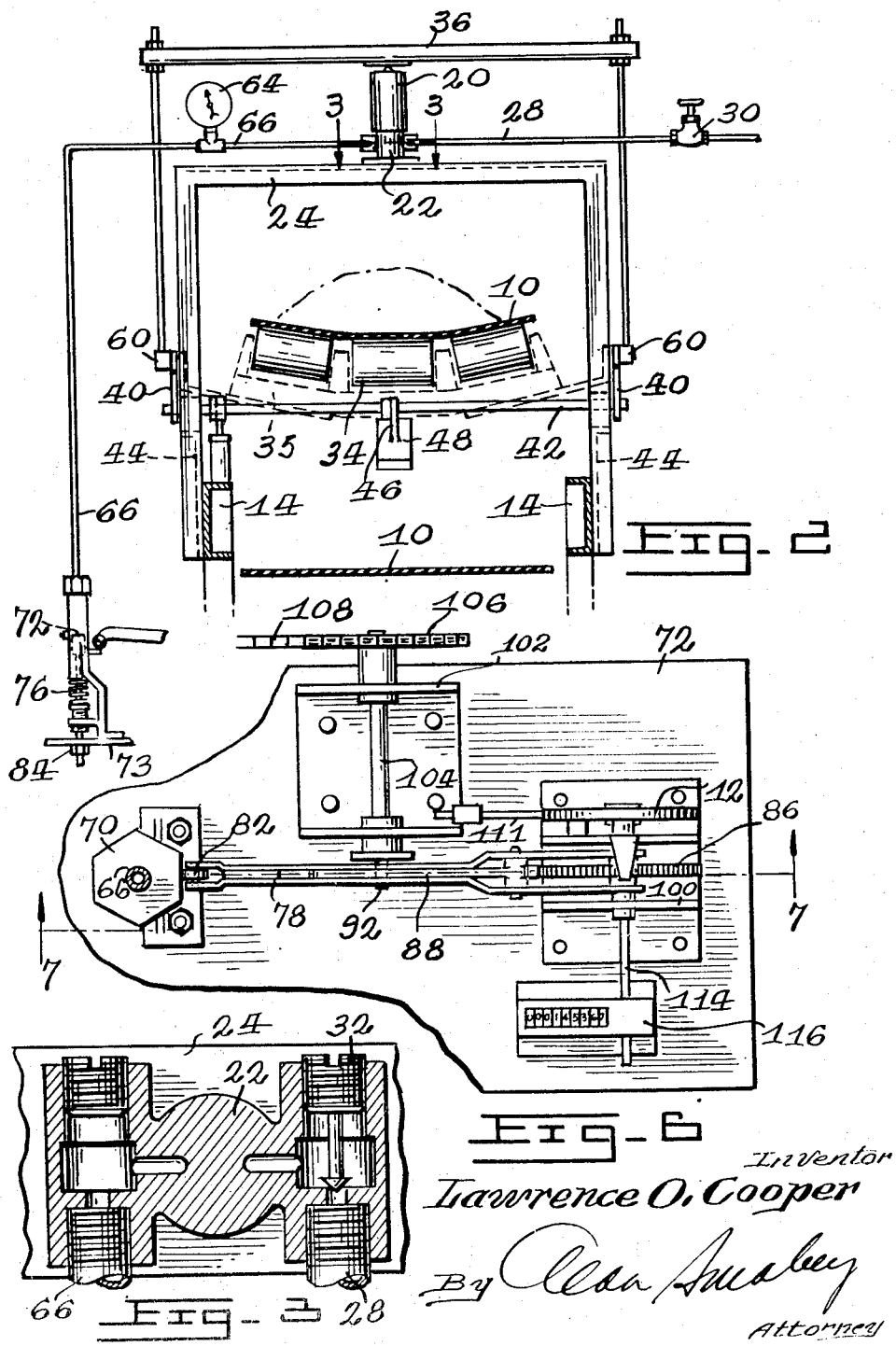

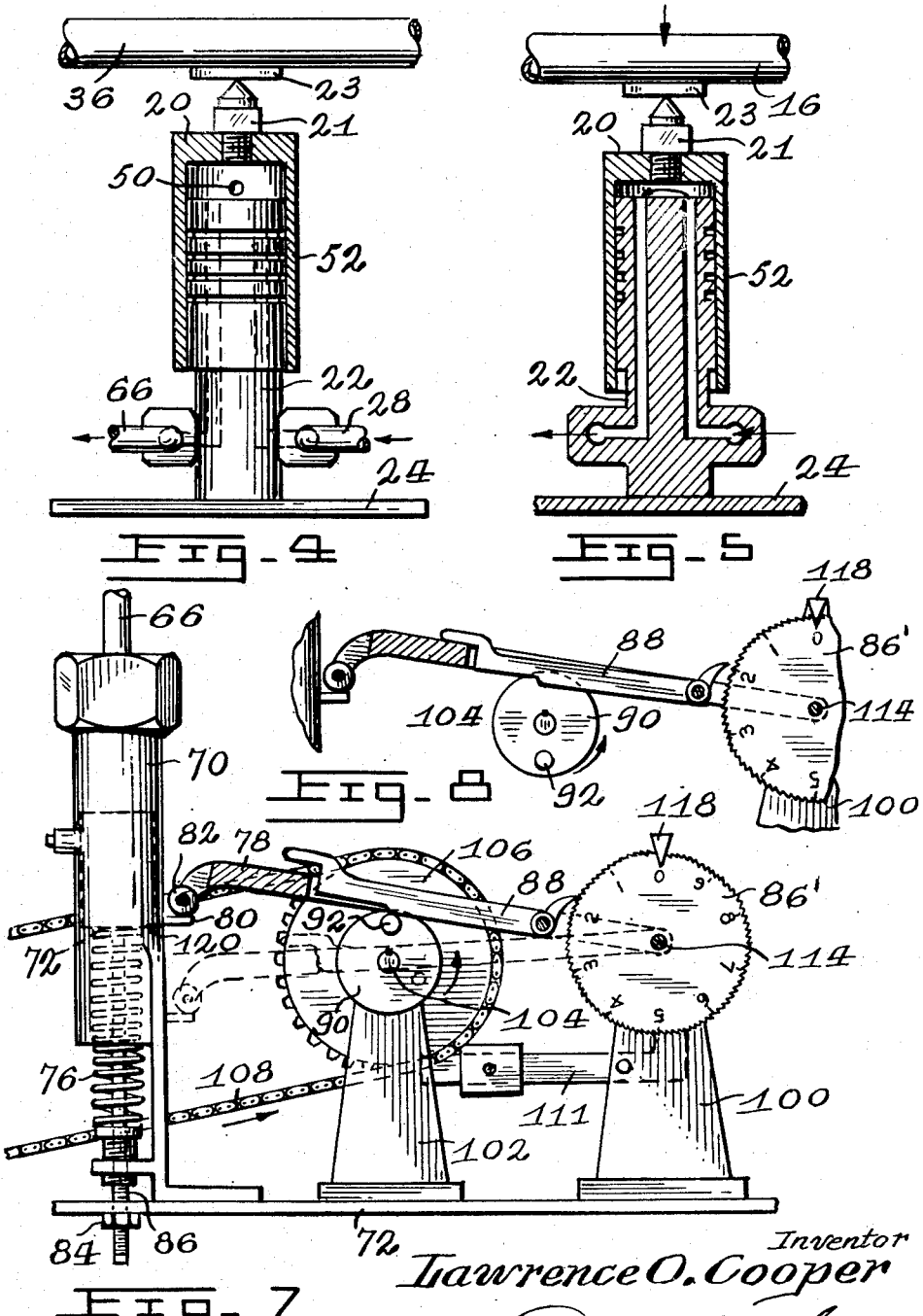

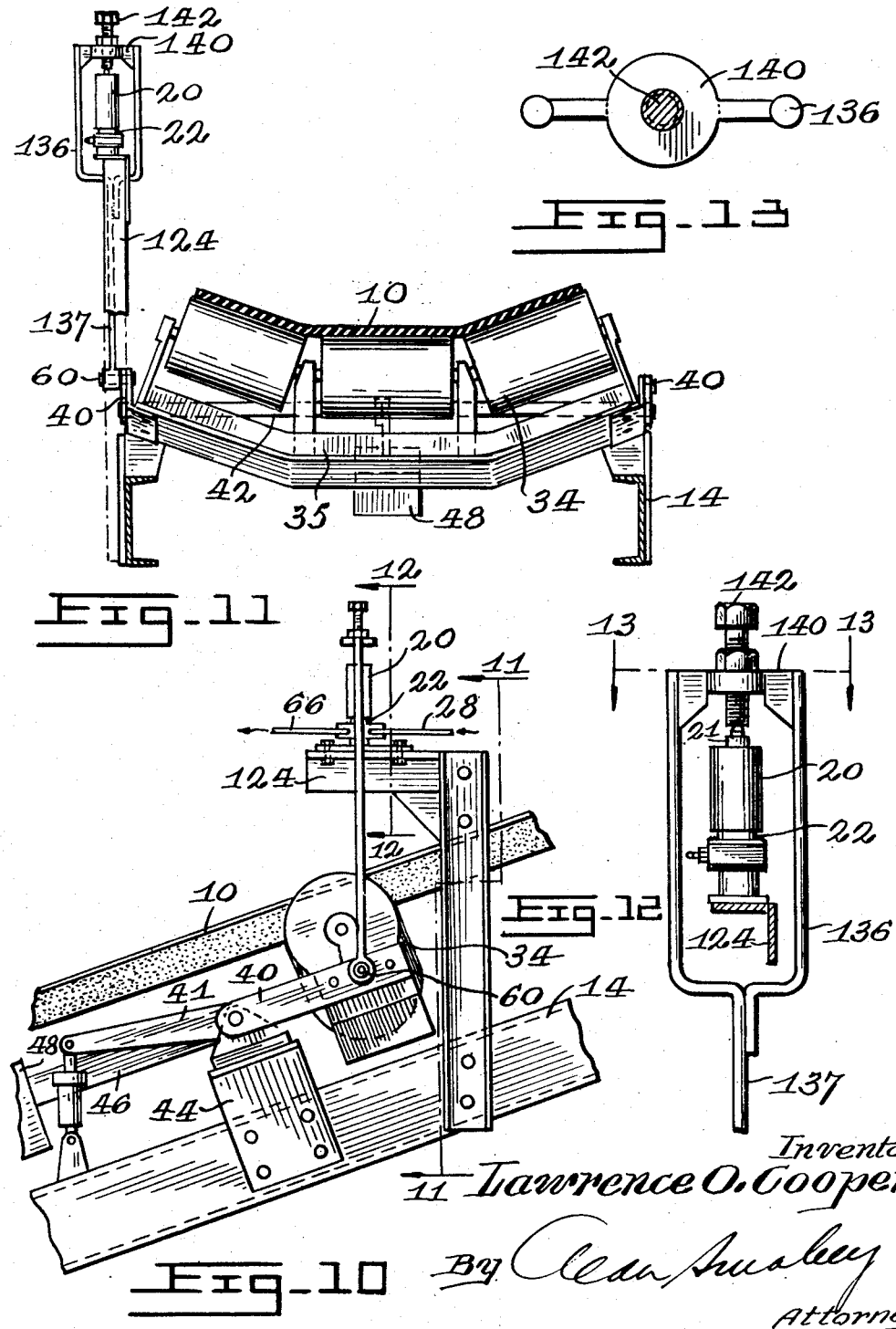

2,671,657

UNITED STATES PATENT OFFICE 2,671,657

DEVICE FOR RECORDING THE TOTAL QUANTITY OF MATERIAL PASSING OVER CONVEYER BELTS

Lawrence O. Cooper, Schumacher, Ontario, Canada

Application July 18, 1949, Serial No. 105,342

2 Claims. (Cl. 265—5)

Introduction

This invention relates to weighing apparatus for the continuous weighing of material as it is conveyed from one point to another, for example, fed to or delivered from processing apparatus.

More particularly, the present invention relates to apparatus of this nature that is adapted to measure, indicate, and record, the flow of material as it passes over the belt of a conveyor system.

A great deal of the prior apparatus designed for this purpose utilize complicated systems of weights, balances, cams, and electrical circuits, making their initial manufacture and installation a costly matter and moreover due to the complexity of their controls, also make subsequent servicing and maintenance a considerable item.

The present invention recognizes these problems and it aims to provide a satisfactory solution for them by providing a novel apparatus, for the continuous weighing and recording of conveyed materials passing over a belt conveyor system, that is designed so as to have a structure that lends itself readily to manufacture and installation and at the same time is accurate and reliable.

Applicant's development

In accordance with the foregoing, the invention comprises a material weighing apparatus that is adapted to be installed on an endless conveyor system, and which includes means whereby material conveyed by such a system is continuously weighed, the rate of material flow visually indicated, and a cumulative total of all material conveyed within any predetermined period of time accurately recorded.

More specifically, the preferred construction of a weighing apparatus according to the invention includes means whereby the net weight of material on a fixed length of the conveying belt controls the pressure of air in a cylinder, so that the pressure varies directly as the load. This pressure is utilized to actuate a pressure responsive dial so as to visually indicate the rate of flow and simultaneously to control the amount of revolutions per stroke on a ratchet type totalizing device, including a ratchet wheel actuated through a cam operated ratchet lever. The number of revolutions per minute made by the driving cam of the totalizing device being proportionate to the speed of the belt so that the total revolutions made by the ratchet wheel is proportionate to the total quantity of material passing over the belt.

The preferred construction of the apparatus making this pressure transmission possible includes a cylinder that is movable up and down on a fixed piston. The fixed piston is mounted on a conveyor frame above the conveyor belt, and air under pressure, is delivered to the piston so as to raise the cylinder. Suitable conduit means are connected to the piston to deliver and exhaust the air in the piston and control means are provided so that the pressure acting against the cylinder may be regulated as desired. The cylinder is constructed so as to have an exhaust port opening in the upper portion of the cylinder wall so that when the cylinder is raised by the air pressure above a predetermined point the exhaust port is above the top surface of the fixed piston and allows air to escape and thus reduce the pressure.

By means of apparatus, including a yoke positioned over the conveyor belt, the cylinder is adapted to directly support a section of the conveyor rollers. Preferably, the contacting surfaces between the yoke and cylinder are constructed so as to have a point contact in order to provide the maximum of pressure responsive sensitivity. In co-operation with this apparatus, a pair of pivotally mounted lever arms are utilized to maintain the section of the conveyor rollers supported by the yoke in alignment with the belt. These lever arms are pivotally attached to the roller section at either side, and are pivotally mounted to the conveyor frame where they are counterbalanced by an adjustable balance weight so that the weight of the conveyor rollers as acting against the yoke and cylinder is compensated for when there is no load on the conveyor belt. This allows the air pressure delivered and exhausted from the fixed piston supporting the cylinder to be adjusted to the correct pressure required to raise the cylinder sufficiently to just clear the exhaust port when there is no load on the conveyor belt.

With this arrangement, any increase of load in the belt as caused by the weight of the material tends to move the cylinder downwards, thus forcing the exhaust port below the fixed piston and the pressure in the cylinder builds up to balance the extra load on the belt. In this way, the pressure in the cylinder can be made to vary directly as the load on the belt from some predetermined minimum value. In order to utilize this pressure change for weighing purposes, a pressure gauge is connected into the conduit leading from the exhaust side of the piston so that the variation in pressure within the cylinder is visually indicated on the gauge so as to indicate the rate of flow of material passing over the portion of the conveyor belt supported by the pressure responsive section of conveyor rollers.

In order that the accumulative total of the material flowing over the belt be recorded, the conduit extending from the exhaust side of the piston is connected to a second cylinder mounted on a portion of the conveyor frame. A piston is slidably mounted within this cylinder and an adjustable spring is adapted to act against the downward movement of the piston as it is forced outwardly from the cylinder by the pressure of air.

A lever arm is connected to and projects outwardly from the bottom of the piston and is adapted to contact the end of a pivotally mounted ratchet lever so as to raise or lower the end of the ratchet lever as the piston moves up or down. The ratchet lever is pivotally mounted at the end remote from the cylinder to a toothed ratchet wheel and a pivotally mounted pawl lever supported by the ratchet lever is adapted to engage the teeth of the ratchet when raised, the number of teeth engaged by the pawl lever being dependent on the position of the ratchet lever as it is raised or lowered by the piston.

The ratchet wheel is rotatably mounted on the conveyor frame adjacent the second cylinder and a crankwheel is mounted on the frame intermediate the ratchet lever ends so that the crank pin contacts the pawl lever and raises it on each revolution. The crankwheel is driven by a suitable sprocket and chain from one of the conveyor belt pulleys so that the revolutions per minute of the crankwheel are directly proportionate to the speed of the belt. The ratchet pawl is mounted on the ratchet lever so that when the crank arm is not in contact with the pawl lever the upward movements of the ratchet lever as actuated by the piston lever arm will not rotate the ratchet wheel.

With this arrangement, at each complete revolution of the crankwheel the ratchet pawl lever is lifted to some top portion. Since the bottom position of the ratchet lever varies, as the position of the lever arm and piston in the second cylinder is varied by the fluctuation of pressure in the first cylinder, the amount of rotation of the ratchet wheel per revolution of the crankwheel varies as the load on the conveyor belt. The ratchet wheel is connected directly to a rotary counter so as to provide a visual record of the revolutions of the ratchet wheel and accordingly the total load of material that passes over the conveyor belt within any predetermined period of time. In the preferred construction the ratchet wheel is marked so as to indicate partial revolutions and a friction brake is provided so as to prevent movement of the wheel when the ratchet pawl is disengaged.

*Detailed description*

Having thus generally described the nature of the invention particular reference will be made to the accompanying drawings, and in which:

Figure 1 is a diagrammatic view in side elevation of a portion of a conveyor belt system embodying a weighing apparatus constructed according to the invention.

Figure 2 is a diagrammatic view of a portion of the apparatus of Figure 1, illustrating the arrangement of the belt supporting yoke and pressure responsive cylinder to the conveyor frame.

Figure 3 is an enlarged sectional view along the lines 3—3 of Figure 2 illustrating the needle valve pressure control arrangement in the fixed piston.

Figure 4 is a diagrammatic view in side elevation of the main pressure responsive cylinder and the fixed piston with the cylinder in section.

Figure 5 is a diagrammatic view in side elevation of the cylinder and piston corresponding to Figure 4 with the cylinder and piston in section.

Figure 6 is a diagrammatic view in plan of the the mechanism of the ratchet type totalizing portion of the apparatus.

Figure 7 is a side elevational view of the totalizing mechanism along the lines 7—7 of Figure 6.

Figure 8 is a diagrammatic view partially in section of a portion of the apparatus shown in Figure 7 illustrating the driven cam in the inoperative or lower position.

Figure 9 is a detail view in side elevation of the friction brake and friction disk arrangement of the totalizing ratchet wheel.

Figure 10 is a diagrammatic view in side elevation of a portion of a conveyor belt system embodying the apparatus of the invention and illustrating an alternative arrangement of pressure cylinder and yoke.

Figure 11 is a sectional view of Figure 10 along the lines 11—11 to further illustrate the construction thereof.

Figure 12 is a sectional view of Figure 10 along the lines 12—12 to further illustrate the yoke construction.

Figure 13 is a sectional view in plan of Figure 12 along the lines 13—13.

With particular reference to Figure 1 of the drawings, a preferred form of material weighing apparatus constructed according to the invention is embodied in an endless belt conveyor system in which the conveyor belt 10 is supported on rollers 12 mounted on the conveyor frame 14. The lower portion of the belt 10, passing over a snub pulley 16 and a take-up pulley 18, and then extending to a tail pulley (not illustrated) to return along the upper level supported by the rollers 12.

The main pressure responsive cylinder 20 of the apparatus is supported by a supporting frame 24 that is secured to and spans the conveyor frame 14. The cylinder 20 is positioned centrally of the conveyor belt 10 and is slidably mounted on a fixed piston 22 that is secured to the supporting frame 24. Air under pressure is supplied to the piston 22 by a conduit 28 through a reducing valve 30 and is controlled by the needle valve 32 located in the base portion of the piston 22 (as shown in detail in Figure 3).

By means of apparatus including a yoke 36 that spans the conveyor belt 10, the cylinder 20 is adapted to support a section 34 of the conveyor idler rolls. The arms of the yoke 36 are pivotally connected to the supporting frame 38 of the roller section 34 and a pair of pivotally mounted lever arms 40 are secured to each side of the conveyor section 34 so as to maintain the section 34 in alignment with the conveyor belt 10. The lever arms 40 are secured to each end of a shaft 42 that extends across the conveyor frame beneath the belt 10 and the ends of the shaft 42 are journalled in supporting brackets 44, one at each side of the conveyor frame 14. A counterbalance arm 46 is secured centrally of the shaft 42 and an adjustable balance weight 48 is mounted on the arm 46 so that the weight of the conveyor roller section 34 can be compensated for when there is no load on the belt 10.

The cylinder 20 is constructed so as to have an exhaust port 50 in the upper portion of the cylinder wall 52 so that when the cylinder 20 is raised by the pressure of air delivered through the piston 22 to a position above the top surface of the piston 22, a portion of the air escapes and thus reduces the pressure within the cylinder 20. The upper surface of the cylinder 20 is drilled and tapped and a stud 21 formed to have a pointed top inserted. The pointed stud 21 contacts a block 23 secured centrally of the yoke 36 so as to provide the maximum of pressure responsive sensitivity.

A lever arm 41 is secured to the shaft 42 adjacent one end and is connected to a dash pot 43 mounted on the frame 14 to provide a viscous damping for the system.

An alternative construction of the cylinder supporting frame 24 and belt supporting yoke 36 is illustrated in Figures 11 through 13. In this form of the device the pressure responsive cylinder 20 and piston 22 are mounted on a supporting frame 124 that is secured to one side of the conveyor frame 14. The construction of the cylinder 20 and piston 22 are the same as previously described, the difference being that the cylinder 20 is positioned at one side of the conveyor belt 10 instead of centrally. In this arrangement the belt supporting yoke 36 is replaced by a yoke 136 that includes a bifurcate upper portion adapted to span the portion of the frame 124 supporting the cylinder 20. The upper ends of the yoke 136 are bridged by a connecting portion 140 that includes a centrally disposed tapped opening in which is mounted an adjustable contacting screw 142. In order to provide the point contact necessary for the maximum of pressure sensitivity the end of the screw 142 is drilled to correspond with the point of the stud 21 projecting from the cylinder 20 so that the yoke 136 is retained in position over the cylinder 20 by the engagement of the point of the stud 21 and the depression in the screw 142. The downwardly extending arm 137 of the yoke 136 is pivotally connected to the supporting frame 35 of the roller section 34 at the pivot point 60, the arrangement of the lever arms 40 and counterbalance arm 46 being the same as previously described.

With this apparatus any increase in the load on the belt 10 tends to force the roller section 34 and yoke 36 or 136 downwards, and this downward motion is transmitted to the cylinder 20 so as to place the exhaust port 50 below the top surface of the fixed piston 22. The pressure in the cylinder 20 then builds up to balance the extra load on the belt 10 and thus the pressure in the cylinder 20 can be made to vary directly as the load on the belt 10 from some set minimum value.

It is of prime importance to the accuracy of the device that the upward and downward movement of the cylinder 20 be reduced to the minimum over the whole range of loads. This is accomplished by having the pressure responsive conveyor belt roller section 34 in line with the conveyor belt rollers on each side of the pressure responsive apparatus. It is also contemplated in this respect that a flat topped hole exhaust port 50 would give even smaller movements to the cylinder 20 than the circular port 50 illustrated, as the flat top would provide more area for the escape of air immediately it cleared the upper surface of the piston 22.

The pivotal point 60 of the lever arms 40 is in line with the centre of gravity of the roller section 34 and the arms 40 and the balance arm 46 are arranged so as to be parallel to the belt 10 so that the pull extended by the arms 40 on pivotal point 60 has no component at right angles to the belt. This is necessary to ensure that the load in the pressure responsive cylinder 20 is proportional to the load on the conveyor belt 10.

In order to utilize the pressure change in the cylinder 20 for weighing purposes a pressure gauge 64 is connected in the conduit 66 that extends from the exhaust side of the cylinder 20 so that the variation in pressure within the cylinder 20 is visually indicated on the dial of the gauge. This indicates the instantaneous weight of material passing over the pressure responsive section of the belt 10.

The pressure variation in the cylinder 20 is also utilized to record the accumulative total of material passing over the conveyor belt 10 by means of the following apparatus.

The conduit 66 extends beyond the pressure gauge 64 and is connected to a second cylinder 70 that is mounted in a vertical position on a supporting frame 73 secured beneath the conveyor frame 14. A piston 72 is slidably mounted in the cylinder 70 and an adjustable spring 76 is mounted so as to act against the downward movement of the piston 72 as it is forced outwardly from the cylinder 70 by pressure from the cylinder 20. On reduction of the pressure from the cylinder 20, as would be caused by no load on the belt 10, the piston 72 is urged upwards by the spring 76 so that the piston 72 moves in an upward and downward motion corresponding to the variations in pressure in the cylinder 20.

This upward or downward motion is transmitted to one end of a pivotally mounted ratchet lever 78 by an outwardly projecting lever arm 80 that is secured to the bottom of the piston 72 and extends through a slot in the lower portion of the cylinder 70. A roller 82 is rotatably mounted on the end of the ratchet lever 78 that contacts the stud 80 so as to eliminate friction and an adjusting nut 84 is provided on the shaft 86 on which the spring 76 is mounted so that the piston position can be adjusted for zero load.

The end of the ratchet lever 78 remote from the cylinder is pivotally mounted to a toothed ratchet wheel 86' and a pivotally mounted pawl lever 88 mounted on the ratchet lever 78 is adapted to engage with the teeth of the ratchet wheel 86 when raised. The ratchet wheel 86 is mounted on supporting standards 100 secured to the frame 72 and a crankwheel 90 that includes an outwardly projecting crank pin 92 is mounted between standards 102 intermediate the ends of the ratchet lever 78 so that the crank pin 92 contacts and raises the pawl lever 88 on each revolution of the crankwheel 90.

The crankwheel 90 is mounted on a shaft 104 rotatably mounted between the standards 102 and a sprocket 106 is secured to the shaft 104 and is driven by a chain 108 from a sprocket 110 secured to the shaft of the conveyor belt snub pulley.

The sprocket and chain drive arrangement from the conveyor belt pulley to the crank wheel is arranged so that the revolutions per minute of the crank wheel are directly proportionate to the speed of the belt. Preferably the ratio between the sprockets 106 and 110 is such that the crank wheel 90 makes a complete revolution for each 6 feet of travel of the belt 10 for normal conditions.

It is contemplated in this respect, that the ratio between the sprockets 106 and 110 could be varied to suit lower or higher conveyor belt speeds. The main idea is that the crank wheel 90 be rotated as fast as possible without going sufficiently fast to throw the ratchet pawl 88 clear of the cam at top speed of travel.

The ratchet pawl 88 is mounted on the ratchet lever 78 so that when the crank pin 92 is not in contact with the pawl 88, as is shown in Figure 8, the upward movements of the ratchet lever 78 as actuated by the projecting lever arm 80 will not engage the pawl 88 and rotate the ratchet wheel 86.

In order to obtain the maximum of accuracy in the device, the ratchet wheel 86 includes as large a number of teeth as is possible, the preferred construction having 500 teeth, and a friction brake 111 is pivotally mounted on the standards 100 that support the ratchet wheel 88 so as to engage a friction disc 112 as is shown in detail in Figure 9. The friction disc 112 is secured to the end of the shaft 114 on which the ratchet wheel 86 is mounted so as to prevent any movement of the ratchet wheel 86 while the ratchet pawl 88 is disengaged.

In operation, on each complete revolution of the crank wheel 90, the ratchet lever 78 and pawl lever 88 are lifted to some top position. Since the bottom position of the ratchet lever 78 varies, as the position of the piston 72 and stud 80 is varied by the fluctuation of pressure in the cylinder 20, the amount of teeth engaged by the ratchet pawl 88 and consequently the amount of rotation of the ratchet wheel 86 per revolution of the crank wheel 90 varies as the load on the conveyor belt 10.

The shaft 114 is connected to a suitable counter 116 so as to provide a visual record of the number of revolutions of the ratchet wheel 86 and accordingly the accumulative total of material that passes over the belt 10 within any predetermined period of time. An indicator 118 is provided on the standard 100 and the face of the ratchet wheel 86 is marked off so as to indicate partial revolutions of the ratchet wheel 86.

In order to make the ratchet wheel 86 indicate a correct mathematical total of ratchet lever movements, the tension of the spring 76 is adjusted by the nut 84 so that with no load on the belt the projecting lever arm 80 is below the top position of the end of the ratchet lever 78 by an amount corresponding to one half a ratchet wheel tooth. This position can be marked on the side of the cylinder 70 as is indicated at 120 (see Figure 7). In this way each individual movement of the ratchet pawl lever may rotate the ratchet wheel ½ tooth over or ½ tooth under the correct amount. In the summation of movements over a period of time, therefore, the error due to ratchet teeth is eliminated rather than being cumulative.

I claim:

1. An apparatus for the continuous weighing of material passing over a conveyor belt system including conveyor belt supporting rollers and idler rollers, comprising, a pressure responsive cylinder including an exhaust port adjacent the upper end and being slideably mounted on a fixed piston for restricted vertical movement mounted over the plane of travel of the conveyor belt, said fixed piston including an opening extending axially therethrough constituting a fluid passage leading into said cylinder, a controlled source of fluid under pressure connected to said piston passage, said pressure responsive cylinder having a top bearing surface of conical form, a yoke mounted over said pressure responsive cylinder and being supported centrally on the apex of said cylinder bearing surface, said yoke including depending arms pivotally connected to a section of said conveyor belt idler rollers, said conveyor belt idler roller section being mounted on counter-balanced lever arms beneath the travel of said conveyor belt, recording means controlled by pressure variation in said pressure responsive cylinder, conduit means between said piston passage and said recording means, and drive means operatively connecting said recording means to the supporting rollers of said conveyor belt, whereby the weight of material passing over said conveyor belt supported section is adapted to cause fluctuations of pressure in said pressure responsive cylinder and said pressure variation is transmitted to said recording means.

2. An apparatus as claimed in claim 1 wherein said recording means comprises a pressure responsive cylinder, a piston mounted in said cylinder, a resilient means urging said piston within said cylinder, said conduit means being connected to said cylinder, a toothed ratchet wheel mounted for rotation about a stationary axis in spaced-apart relationship from said cylinder, a ratchet lever having one end pivotally connected to said ratchet wheel axis with the other end connected to said piston, a second lever arm pivotally mounted on said ratchet lever arm and having a pawl at one end adapted to engage the teeth of said ratchet wheel, a cam wheel mounted for rotation beneath said ratchet lever including an extension adapted to intermittently engage said second lever arm, means to rotate said cam, said piston being disposed with respect to said cylinder so as to normally support said second lever arm above said cam extension and when extended from said cylinder under pressure to lower said lever arm into the path of said cam extension, whereby the actuation of said lever arm by said cam extension is adapted to rotate said ratchet wheel an amount proportionate to said piston extension.

LAWRENCE O. COOPER.

References Cited in the file of this patent

UNITED STATES PATENTS

| Number | Name | Date |
| --- | --- | --- |
| 954,869 | Merrick | Apr. 12, 1910 |
| 954,870 | Merrick | Apr. 12, 1910 |
| 1,014,604 | Messiter | Jan. 9, 1912 |
| 1,032,183 | Buchan | July 9, 1912 |
| 1,098,197 | Walters | May 26, 1914 |
| 1,251,680 | Messiter | Jan. 1, 1918 |
| 1,257,376 | Merrick | Feb. 26, 1918 |
| 1,354,785 | Strand | Oct. 5, 1920 |
| 2,285,719 | Jerome | June 9, 1942 |
| 2,365,937 | Christman | Dec. 26, 1944 |
| 2,371,040 | Fisher | Mar. 6, 1945 |
| 2,437,178 | Wharton | Mar. 2, 1948 |
| 2,444,329 | Booth | June 29, 1948 |
| 2,488,760 | Brown | Nov. 22, 1949 |